(12) United States Patent
Fukumoto

(10) Patent No.: US 9,874,945 B2
(45) Date of Patent: Jan. 23, 2018

(54) LOW-PROFILE POINTING STICK

(71) Applicant: Microsoft Technology Licensing, LLC, Redmond, WA (US)

(72) Inventor: Masaaki Fukumoto, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 14/180,207

(22) Filed: Feb. 13, 2014

(65) Prior Publication Data

US 2015/0227217 A1 Aug. 13, 2015

(51) Int. Cl.

| | |
|---|---|
| *G06F 3/0338* | (2013.01) |
| *G06F 3/01* | (2006.01) |
| *G06F 3/044* | (2006.01) |
| *G06F 17/30* | (2006.01) |
| *G06F 3/0354* | (2013.01) |
| *G06F 3/02* | (2006.01) |

(52) U.S. Cl.
CPC ............ *G06F 3/0338* (2013.01); *G06F 3/016* (2013.01); *G06F 3/0205* (2013.01); *G06F 3/0354* (2013.01); *G06F 3/044* (2013.01); *G06F 17/30256* (2013.01); *G06F 3/0202* (2013.01)

(58) Field of Classification Search
CPC ........ G06F 3/0338; G06F 3/016; G06F 3/044; G06F 3/0354; G06F 3/0205; G06F 17/30256; G06F 3/0202; H01H 36/006; H01H 25/04; H01H 1/021; H01H 13/703; H01H 13/785; H01H 13/83; H01H 2019/006; H01H 21/00; H01H 23/00

USPC ................... 345/156–178; 178/18.01–20.01; 340/407.2; 341/20; 74/471; 200/4
See application file for complete search history.

(56) References Cited

U.S. PATENT DOCUMENTS 5,691,747 A 11/1997 Amano
5,943,233 A * 8/1999 Ebina .................... G06F 3/0304
                                                                        250/221
6,057,540 A 5/2000 Gordon et al.
(Continued)

FOREIGN PATENT DOCUMENTS

CN 101646314 A 2/2010
EP 0660258 6/1995
(Continued)

OTHER PUBLICATIONS

Transparent PORON, Rogers Corporation, 2010.*
(Continued)

*Primary Examiner* — Vinh Lam
(74) *Attorney, Agent, or Firm* — Drinker Biddle & Reath LLP

(57) ABSTRACT

A low-profile, small-footprint gel-based pointing device is described herein. The gel-based pointing device described herein includes a gel-based body, a tactile surface affixed to a first side of the gel-based body, and a base surface affixed to a second side of the gel-based body that is opposite the first side. The tactile surface is configured to receive an input from a user and the base surface couples the gel-based body to a sensor surface. In at least one embodiment, the gel-based pointing device described herein further includes a sensor for receiving the gel-based pointing device and a detector for detecting changes in at least one of resistance, capacity, pressure, or lateral or vertical position of the gel-based pointing device.

20 Claims, 11 Drawing Sheets

(56) References Cited

U.S. PATENT DOCUMENTS

| | | | |
|---|---|---|---|
| 6,373,265 B1 | 4/2002 | Morimoto et al. | |
| 6,424,338 B1 | 7/2002 | Anderson | |
| 6,518,954 B1 | 2/2003 | Chen | |
| 6,642,857 B1 | 11/2003 | Schediwy et al. | |
| 7,176,889 B2 | 2/2007 | Baker et al. | |
| 7,986,306 B2* | 7/2011 | Eich | G06F 3/0219 345/156 |
| 8,004,052 B2 | 8/2011 | Vaganov | |
| 8,022,944 B2* | 9/2011 | Suzuki | G06F 3/03548 345/156 |
| 8,035,050 B1 | 10/2011 | Hsu et al. | |
| 8,120,579 B2 | 2/2012 | Slotta | |
| 8,125,445 B1 | 2/2012 | Anderson | |
| 8,316,725 B2 | 11/2012 | Wade | |
| 8,547,333 B2* | 10/2013 | Pasquero | G06F 3/016 345/157 |
| 8,599,162 B2 | 12/2013 | Argiro | |
| 8,859,971 B2* | 10/2014 | Weber | G01J 1/0407 250/353 |
| 8,902,173 B2 | 12/2014 | Seguine | |
| 8,987,620 B2* | 3/2015 | Gohng | G06F 3/016 200/61.54 |
| 8,988,395 B2* | 3/2015 | Soo | G06F 3/0416 178/18.01 |
| 9,134,187 B1 | 9/2015 | Organ et al. | |
| 9,158,383 B2 | 10/2015 | Shaw et al. | |
| 9,170,658 B2* | 10/2015 | Quek | G06F 3/033 |
| 9,201,511 B1* | 12/2015 | Spurlock | G06F 3/0304 |
| 9,691,563 B2* | 6/2017 | Okazaki | H01H 3/12 |
| 2001/0007449 A1* | 7/2001 | Kobachi | G01S 7/4811 345/156 |
| 2001/0011994 A1 | 8/2001 | Morimoto et al. | |
| 2004/0027331 A1 | 2/2004 | Mochizuki et al. | |
| 2005/0063757 A1* | 3/2005 | Sugimura | G06F 1/1626 400/472 |
| 2005/0190152 A1* | 9/2005 | Vaganov | G06F 3/0338 345/157 |
| 2005/0253810 A1 | 11/2005 | Slotta | |
| 2006/0028442 A1 | 2/2006 | Bynum et al. | |
| 2006/0262088 A1 | 11/2006 | Baldo et al. | |
| 2007/0068779 A1 | 3/2007 | Baldo et al. | |
| 2007/0245836 A1 | 10/2007 | Vaganov | |
| 2008/0032795 A1 | 2/2008 | Sternberg et al. | |
| 2008/0295610 A1 | 12/2008 | Inamori | |
| 2009/0008162 A1 | 1/2009 | Yang et al. | |
| 2010/0079409 A1* | 4/2010 | Sirotich | G06F 3/0425 345/175 |
| 2010/0164870 A1* | 7/2010 | Kunthady | H01H 13/704 345/168 |
| 2010/0176973 A1 | 7/2010 | Yamasaki | |
| 2010/0193259 A1 | 8/2010 | Wassvik | |
| 2010/0220900 A1* | 9/2010 | Orsley | G06F 3/0421 382/124 |
| 2010/0265201 A1 | 10/2010 | Oh | |
| 2011/0127788 A1* | 6/2011 | Nakanishi | G01D 5/34715 294/110.1 |
| 2011/0157056 A1 | 6/2011 | Karpfinger | |
| 2011/0298705 A1 | 12/2011 | Vaganov | |
| 2012/0160657 A1 | 6/2012 | Mizushima | |
| 2012/0161795 A1 | 6/2012 | Pfau et al. | |
| 2012/0194207 A1 | 8/2012 | Vaganov et al. | |
| 2012/0242581 A1 | 9/2012 | Laubach | |
| 2012/0249413 A1 | 10/2012 | Sugahara | |
| 2012/0256867 A1* | 10/2012 | Annacone | G06F 3/044 345/174 |
| 2012/0319937 A1 | 12/2012 | Lee et al. | |
| 2013/0194183 A1 | 8/2013 | Odgers | |
| 2014/0253305 A1 | 9/2014 | Rosenberg et al. | |
| 2014/0306894 A1* | 10/2014 | Lee | G06F 3/03543 345/166 |
| 2014/0310631 A1* | 10/2014 | Harrison | G06F 3/0484 715/771 |
| 2015/0070319 A1* | 3/2015 | Pryor | G06F 3/0425 345/175 |
| 2015/0227216 A1 | 8/2015 | Fukumoto | |
| 2016/0103505 A1 | 4/2016 | Fukumoto | |

FOREIGN PATENT DOCUMENTS

| | | | |
|---|---|---|---|
| EP | 0905646 | 3/1999 | |
| EP | 2388682 A1 * | 11/2011 | G06F 3/0338 |

OTHER PUBLICATIONS

Kawakami, et al. "Simultaneous Estimation of Optical Flow and Motion Parameters", SICE Annual Conference 2007, Sep. 17-20, 2007, Kagawa University, Japan, 6 pages.

PCT Search Report & Written Opinion for PCT Application No. PCT/US2015/014949, dated Aug. 13, 2015 (21 pages).

Wilson, et al., "FlowMouse a computer vision based pointing and gesture input device", Microsoft Research, International Federation for Information Processing, 2005, 14 pages.

Braniac, "How to Replace a Worn IBM/Lenovo ThinkPad TrackPoint Cap", available at <<http://www.ehow.com/how_5647907_replace-ibmlenovo-thinkpoint-cap.html>>, Oct. 31, 2011, 4 pages.

"Interlink Electronics FSR Force Sensing Resistors", available at <<http://media.digikey.com/pdf/Data Sheets/Interlink Electronics.PDF/HighPrecMicroJoystickIntGuide.pdf>>, Jul. 4, 2013, 30 pages.

Daniel Rubino, "The keyboard for Windows 10 on Phone has a virtual precision pointing stick", available at <<http://www.windowscentral.com/keyboard-windows-10-phone-has-virtual-precision-pointing-stick>>, Jan. 21, 2015, 29 pages.

Tsuchiya, et al., "Virtual Active Touch II Vibrotactile Representation of Friction and a new approach to surface shape display", Oct. 11, 2009, In IEEE/RSJ International Conference on Intelligent Robots and Systems, 6 pages.

Moscovich, et al., "Multi-finger Cursor Techniques", In Proceedings of Graphics Interface, Jun. 2006, 7 pages.

PCT Search Report for PCT Application No. PCT/US2015/014945, dated May 4, 2015 (12 pages).

Office action for U.S. Appl. No. 14/180,177, dated Apr. 5, 2016, Fukumoto, "Low-Profile Pointing Stick", 61 pages.

"International Preliminary Report on Patentability Issued in PCT Application No. PCT/US2015/014945", dated May 23, 2016, 14 pages.

"International Preliminary Report on Patentability Issued in PCT Application No. PCT/US2015/014945", dated Apr. 25, 2016, 10 Pages.

"Second Written Opinion Issued in PCT Application No. PCT/US2015/014949", dated Feb. 10, 2016, 8 Pages.

"Second Written Opinion Issued in PCT Application No. PCT/U52015/014945", dated Jan. 20, 2016, 9 Pages.

Office action for U.S. Appl. No. 14/180,177, dated Nov. 4, 2016, Fukumoto, "Low-Profile Pointing Stick", 65 pages.

Office action for U.S. Appl. No. 14/180,177, dated Feb. 9, 2017, Fukumoto, "Low-Profile Pointing Stick", 84 pages.

* cited by examiner

Section A-A

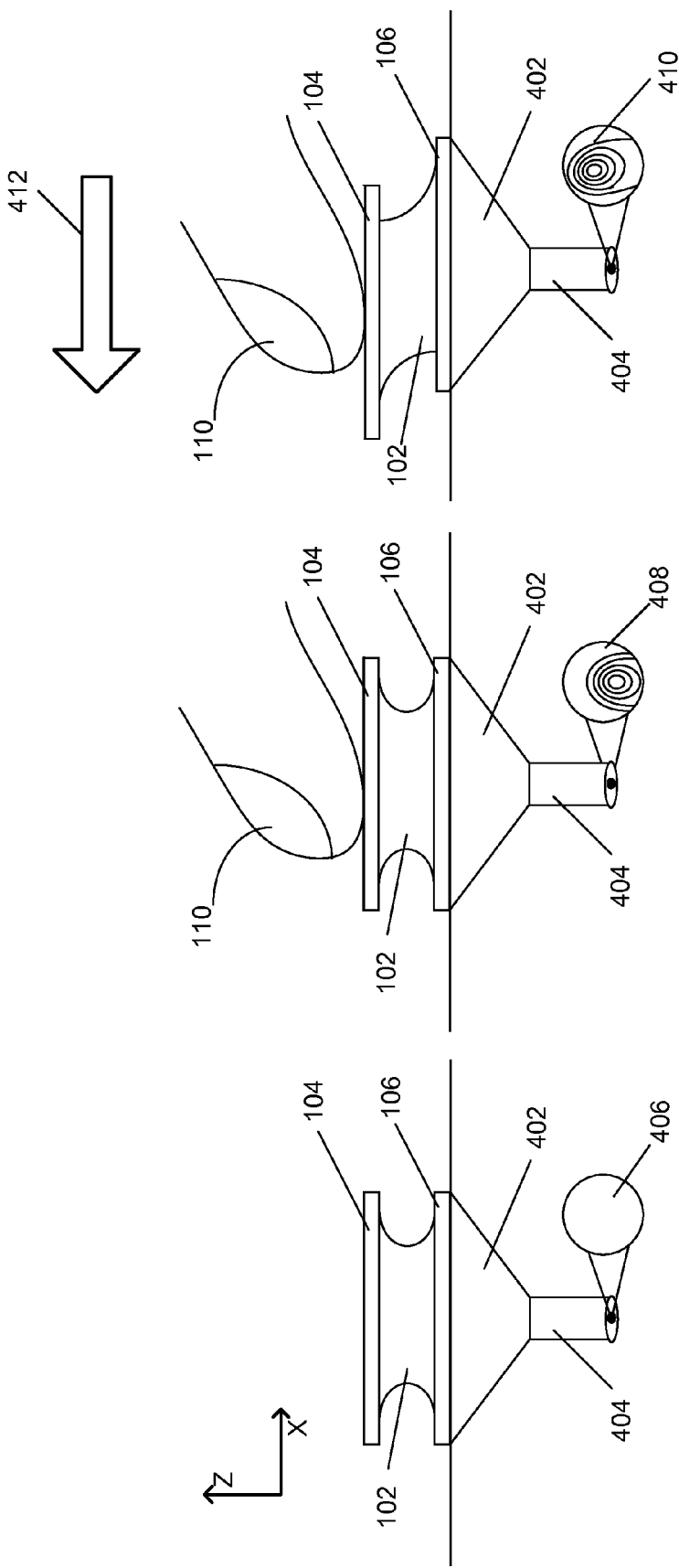

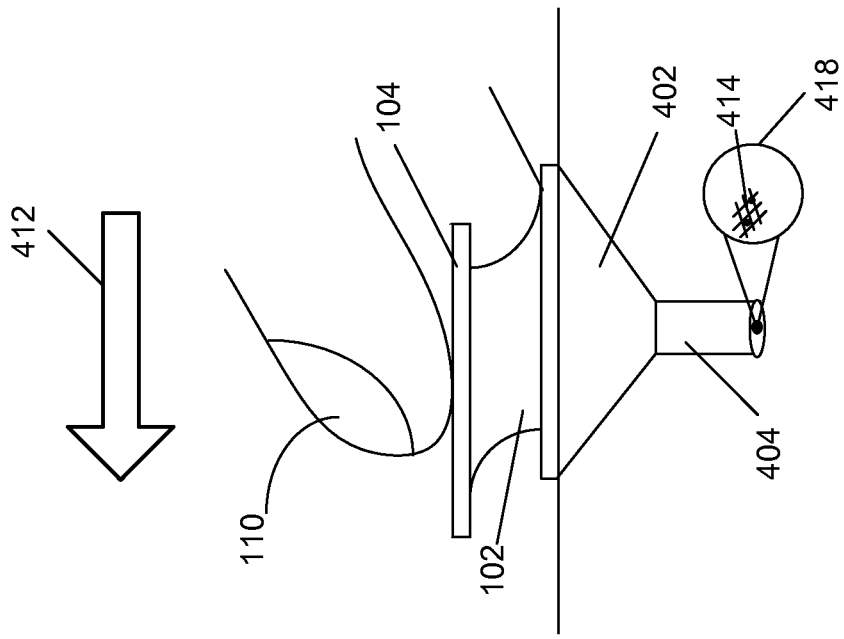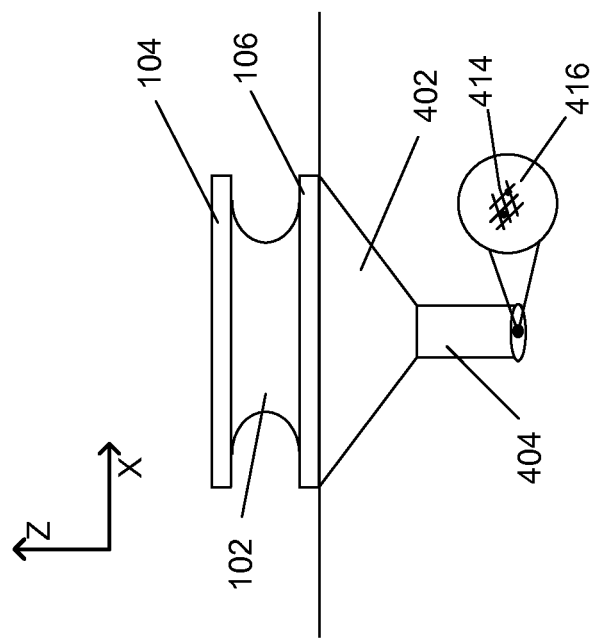
FIG. 4G
FIG. 4F

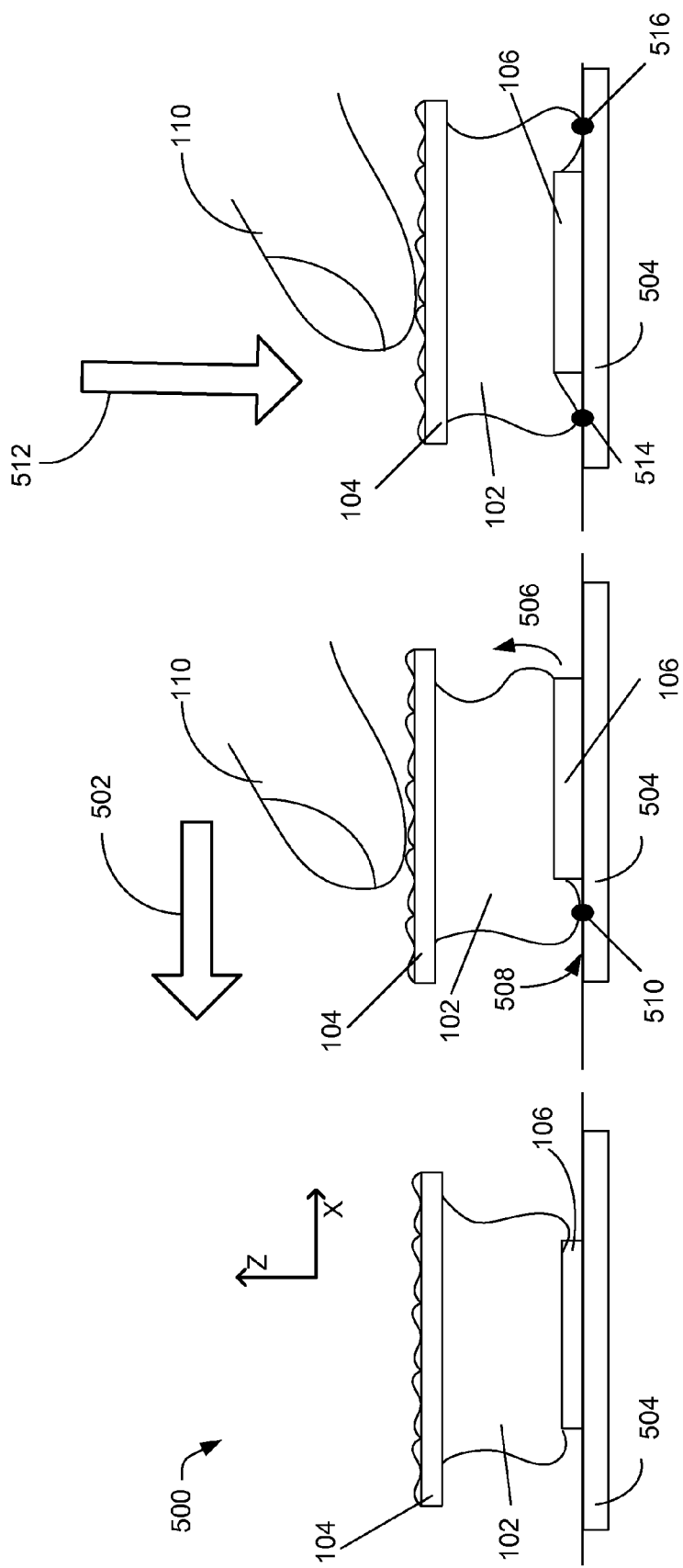

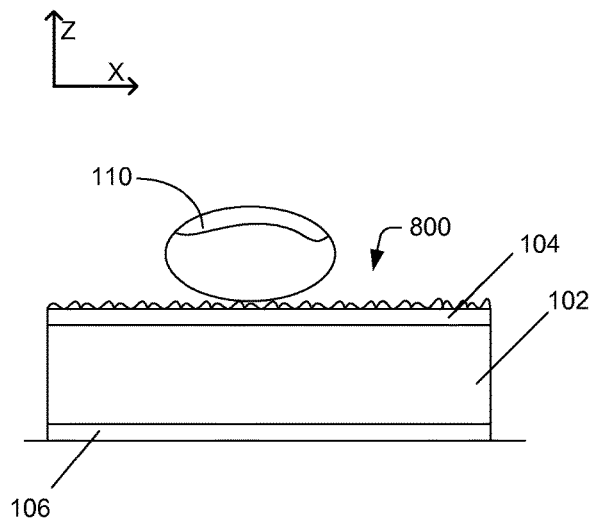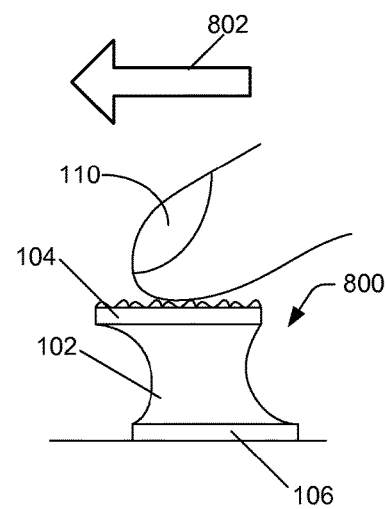
FIG. 8A    FIG. 8B
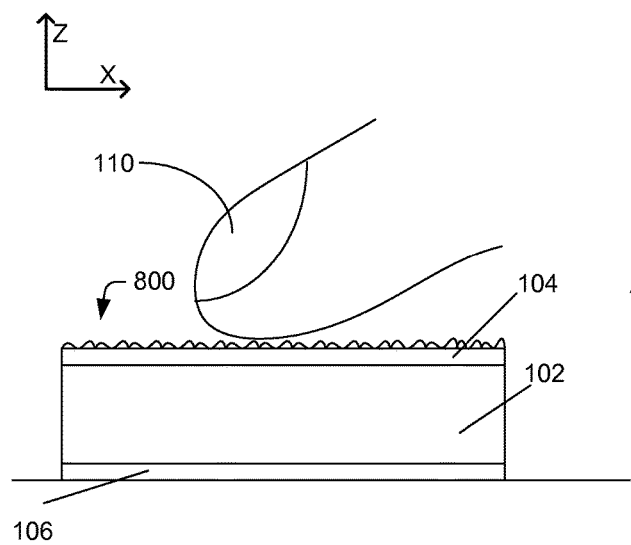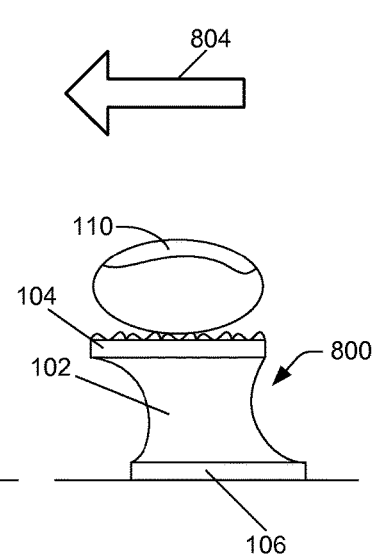
FIG. 8C    FIG. 8D

LOW-PROFILE POINTING STICK

The present application is related to concurrently filed U.S. application Ser. No. 14/180,177, entitled "Low-Profile Pointing Stick," the entire contents of which are hereby incorporated herein in their entirety.

BACKGROUND

A pointing device is an input interface that allows a user to input continuous and multi-dimensional data to a computer. The pointing device can facilitate user input of gestures such as pointing, clicking, or dragging. In response to user input, the gestures are translated by a computing device and used to modify a user interface, often by movement of a relative position of a pointer or cursor on the user interface. For example, if a user interacts with the input interface, such as a touchpad, by moving two fingers in a downwards or upwards motion, the user interface may show a scrolling motion on the currently active page. Two commonly used pointing devices are touchpads (also called trackpads) and pointing sticks.

Touchpads are pointing devices that are commonly used for notebook computers. Typically, touchpads have a touch sensor for receiving user input. The touch sensor is configured to enable translation of a position of a user's finger that is detected by the touch sensor to a relative position on a user interface. Touchpads are typically flat (planar) and have a relatively thin form factor. However, touchpads often require a user to repeatedly reposition his or her finger and/or hand when the user desires to move a cursor a long distance across a user interface.

On the other hand, pointing sticks (e.g., Trackpoint® developed by IBM®, etc.) are small joysticks that are often manipulated by a user's finger and are used to control a cursor or other representation on a user interface. Typically, a pointing stick has a vertical shaft and/or spring-mechanisms that "auto-center" the pointing stick after use. Unlike touchpads, pointing sticks do not require repositioning of a user's finger and/or hand on the pointing stick while the user interacts with the pointing stick. While pointing sticks have a small lateral footprint, the depth that the shaft extends below the top of the pointing stick (i.e., effective height) cannot be easily reduced without compromising functionality, such as an auto-centering feature. Accordingly, it is currently impractical to implement pointing sticks with a relatively thin form factor, which may be desirable for use with thin and light notebook computers such as ultrabooks.

Some pointing devices measure optical-flow through a small hole mounted on an upper tactile surface of a pointing device. Such devices are optical sensor-type pointing devices (e.g., Optical TrackPoint® developed by IBM®, etc.). Optical sensor-type pointing devices typically have a small footprint and are suitable for portable devices. However, optical sensor-type pointing devices lack an auto-centering mechanism and accordingly, require repositioning by the user of the device.

SUMMARY

A low-profile, small-footprint gel-based pointing device is described herein. In various embodiments, the gel-based pointing device described herein includes a gel-based body, a tactile surface affixed to a first side of the gel-based body, and a base surface affixed to a second side of the gel-based body that is opposite the first side. The tactile surface is configured to receive an input from a user. The base surface may affix the gel-based body to a sensor. In at least one embodiment, the gel-based pointing device described herein further includes a sensor for receiving the gel-based pointing device and a detector for detecting changes in at least one of resistance, capacity, pressure, lateral position, and/or vertical position in response to movement of the pointing device.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

DESCRIPTION OF FIGURES

The detailed description is described with reference to the accompanying figures. In the figures, the left-most digit(s) of a reference number identifies the figure in which the reference number first appears. The same reference numbers in different figures indicate similar or identical items.

FIG. 4C is a side elevation view of the illustrative gel-based pointing device of FIG. 4B before engagement by a finger of a user.

FIG. 4D is a side elevation view of the illustrative gel-based pointing device of FIG. 4B during engagement by a finger of a user.

FIG. 4E is a side elevation view of the illustrative gel-based pointing device of FIG. 4B during engagement by a finger of a user.

FIG. 4F is a side elevation view of the illustrative gel-based pointing device of FIG. 4B before engagement by a finger of a user.

FIG. 4G is a side elevation view of the illustrative gel-based pointing device of FIG. 4B during engagement by a finger of a user.

FIG. 5A is a side elevation view of another illustrative gel-based pointing device.

FIG. 5B is a side elevation view of the illustrative gel-based pointing device shown in FIG. 5A while engaged by a finger of a user.

FIG. 5C is a side elevation view of the illustrative gel-based pointing device shown in FIG. 5A while engaged by a finger of a user.

FIG. 8A is a side elevation view of a generally rectangular-shaped gel-based pointing device affixed horizontally on a sensor.

FIG. 8B is another side elevation view of the gel-based pointing device affixed horizontally on a sensor.

FIG. 8C is a side elevation view of a generally rectangular-shaped gel-based pointing device affixed vertically on a sensor.

FIG. 8D is another side elevation view of the gel-based pointing device affixed vertically on a sensor.

DETAILED DESCRIPTION

A low-profile, small-footprint gel-based pointing device is described herein. In various embodiments, the gel-based pointing device described herein includes a gel-based body, a tactile surface affixed to a first side of the gel-based body, and a base surface affixed to a second side of the gel-based body that is opposite the first side. The tactile surface is configured to receive an input from a user. The base surface affixes the gel-based body to a sensor surface. In some embodiments, the gel-based pointing device described herein further includes a sensor for receiving the gel-based pointing device and a detector for detecting changes in at least one of resistance, capacity, pressure, lateral position, and/or vertical position in response to movement of the pointing device.

The apparatuses, techniques, and systems described herein may be implemented in a number of ways. Example implementations are provided below with reference to the following figures.

Illustrative Gel-Based Pointing Device

Figure 1A:
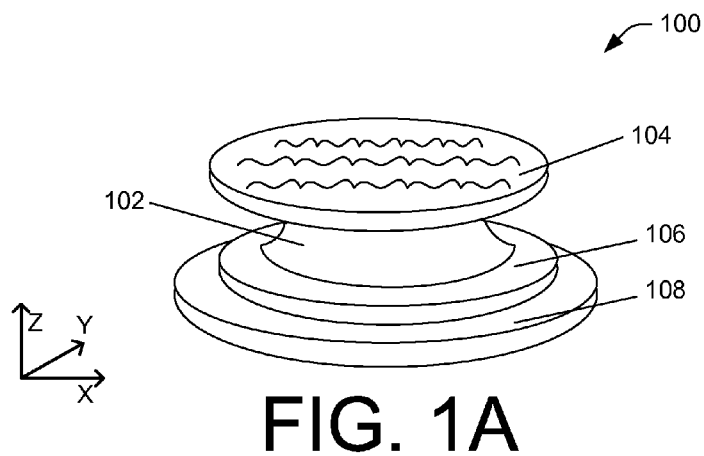
FIG. 1A is an isometric view of an illustrative gel-based pointing device.

FIG. 1A shows low-profile, small-footprint gel-based pointing device 100. In at least one embodiment, the gel-based pointing device 100 includes a gel-based body 102, a tactile surface 104 affixed to a first side of the gel-based body 102, and a base surface 106 affixed to a second side of the gel-based body 102 that is opposite the first side of the gel-based body. In at least some embodiments, the pointing device 100 illustrated in FIG. 1A can have a lateral cross-sectional width (e.g., diameter, etc.) such that the pointing device 100 can fit between one or more keys on a keyboard (e.g., 3 mm to 10 mm), possibly with slight modification of a shape of the keys (e.g., minor cutouts on one or more keys, etc.). Furthermore, the thickness of the pointing device 100 can be selected such that the pointing device 100 can be installed in devices that have relatively thin form factors to accommodate the pointing device (e.g., spacing height approximately 0.5 mm to 1.0 mm).

In at least one embodiment, the gel-based body 102 can be made out of gel material (e.g., urethane, silicone, acryl, etc.). The gel material can be durable to minimize physical deformation. The gel-based body 102 can vary in width (e.g., diameter, etc.), height (i.e., thickness), and hardness. The width, height, and hardness of the gel-based body can affect the extent the gel-based body deforms under a given amount of force applied by a user. In at least one embodiment, the gel material can be a soft gel material defined by a softness attribute associated with an amount of deformation of the gel when subjected to a known force. However, the gel material may be formed with various degrees of softness/hardness as specified to provide a best performance using design considerations where an overly soft gel may be subject to excessive deformation and possibly a higher failure rate (e.g., tearing of the gel, etc.) as compared to an overly hard gel that may be too stiff to allow perceivable tactile deformation by a user. For example, in at least one embodiment, a softer gel material can provide great deformation with a small amount of user input force. In some embodiments, a harder gel material can have less deformation based on the same amount of user input force. To achieve the desired hardness, the gel material can be cured by mixing the gel material with a curing agent, increasing a temperature of the gel material, exposing the gel material to ultraviolet (UV) rays, some combination of the preceding, or by other techniques.

In various embodiments, the gel material can be transparent or opaque. In some embodiments, a transparent gel may be selected for use so that an optical lens can capture imagery of a user's finger or an optically patterned film when the gel is between the optical lens and the user's finger or the optically patterned film. In at least one embodiment, the gel can have resistance to UV rays to prevent the gel material from yellowing. The gel material can be conductive or nonconductive (dielectric). In at least some embodiments, the conductivity of the gel material can be specified by design considerations.

In some embodiments, the gel-based body 102 may be formed in a disc shape having a diameter as a width. However, other shapes and sizes may be used. In at least some embodiments, the gel-based body 102 can have a spool or hourglass shape such that the perimeter of the gel-based body 102 near the tactile surface 104 and the base surface 106 has a larger diameter than the center of the gel-based body 102. In other words, the gel-based body 102 can have a concave curve. In other embodiments, the gel-based body 102 can have a generally rectangular shape and a gel-based pointing device 100 having a generally rectangular shape can be affixed to a sensor vertically or horizontally. In some embodiments, the gel-based body 102 can have an "X" or cross-shape. Additionally, the gel-based body 102 can have a generally square or octagonal shape. In some embodiments, the gel-based body 102 can have a customized shape. The gel-based body 102 can vary in height, width, and thickness. In at least some embodiments, a gel-based body 102 having a disc shape can have varying vertical thickness resulting in different cylinders having different heights. In at least other embodiments, a gel-based body 102 having a generally rectangular shape can have a vertical thickness resulting in a gel-based bar-like pointing device that can be affixed vertically or horizontally to a sensor. Furthermore, one or more gel-based pointing devices can be aligned next to one another on a sensor.

In at least one embodiment, the gel-based body 102 has a tactile surface 104 affixed to a first side of the gel-based body 102. The tactile surface 104 is configured to receive a touch input from a finger of a user. In some embodiments, the tactile surface 104 can be a high friction surface to minimize finger-slip during user input. As a non-limiting example, the tactile surface 104 can be made of a high-friction dimple coating, a high friction fabric surface, a rubber material, or some combination of the preceding. In at least some embodiments, the tactile surface can include a thin film to assist with stabilization and preventing deformation of the gel-based body. In at least one embodiment, the thin film can be made of plastic material (e.g., Polyethylene terephthalate (PET), Acrylonitrile butadiene styrene (ABS), etc.). The tactile surface can be conductive or nonconductive (dielectric). In at least some embodiments, the conductivity of the tactile surface can be specified by design considerations.

In at least one embodiment, the gel-based body 102 has a base surface 106 affixed to a second side of the gel-based body 102 that is opposite the first side. The base surface 106 may have at least one adhesive surface for coupling the gel-based pointing device 100 to an input sensor 108. However, the base surface 106 may be coupled to the input sensor 108 using other known techniques besides adhesion. The base surface 106 can be made of one or more materials and/or one or more layers. For example, the base surface 106 can include a thin film for stabilizing deformation. In at least one embodiment, the thin film can be located between the gel-based body and the adhesive. The thin film may be made of plastic material (e.g., PET, ABS, etc.). The base surface can be conductive or nonconductive (dielectric). In at least some embodiments, the conductivity of the base surface can be specified by design considerations.

The gel-based pointing device 100 can be coupled to a sensor having an input surface. The input surface may detect an input in response to a user action. In at least one embodiment, the sensor can include any of one or more electrodes, touch sensors, or optical sensors. Touch sensors may be at least one of a resistive sensor, a capacitive sensor, or an optical sensor.

Figures 1B, 1C:
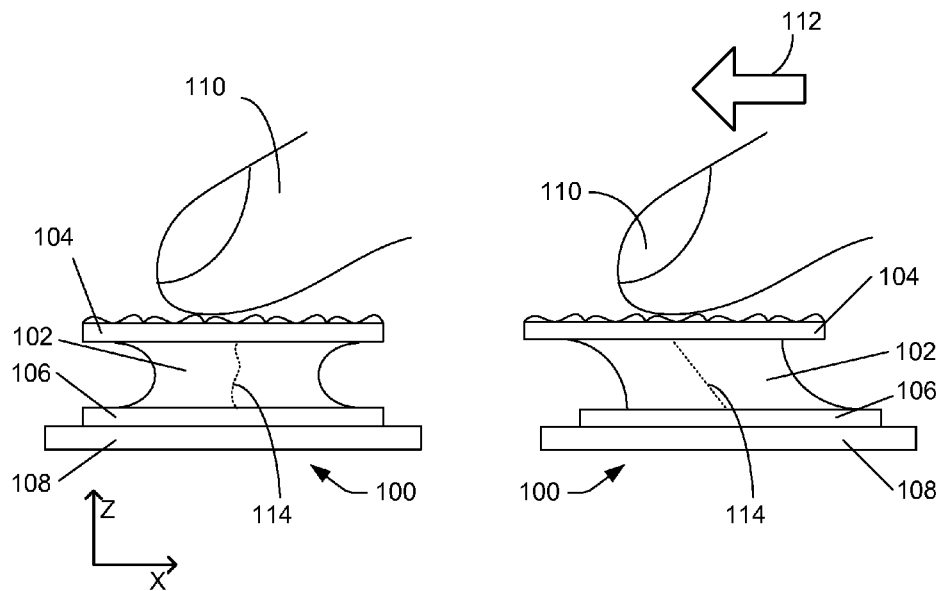
FIG. 1B is a side elevation view of the gel-based pointing device while engaged by a finger of a user.
FIG. 1C is a side elevation view of the gel-based pointing device while engaged by a finger of a user

FIGS. 1B and 1C show user interaction with a gel-based pointing device. As illustrated in FIG. 1B, a finger 110 of a user is interfacing with the tactile surface 104 of the gel-based pointing device 100. In FIG. 1B, the finger 110 is not applying vertical or lateral pressure to the gel-based pointing device 100. As a result, the gel-based pointing device 100 is not vertically deformed or laterally deformed and applies or translates no force or no change in force to the sensor 108. In other words, the gel-based body 102 maintains its original or default shape that is caused by shape-memory of the gel that creates an auto-centering ability of the gel-based pointing device 100.

When a user applies lateral and/or vertical pressure to the gel-based pointing device 100, the gel-based pointing device 100 may deform as shown in FIG. 1C. As a result, the gel-based pointing device 100 displaces vertically or laterally in the direction of the input pressure caused by the user, and applies or translates a force or a change in force to the sensor 108. For example, in FIG. 1C, the finger 110 applies lateral pressure in the direction illustrated by the left-facing arrow 112. As a result, the gel-based body 102 is laterally deformed in the same direction that the lateral pressure is applied.

Once the user removes his or her finger 110 from the tactile surface 104 of the gel-based pointing device 100, the gel-based pointing device 100 returns to its original shape, as shown in FIG. 1B, and applies or translates no force or no change in force to the sensor 108. The gel material can act as an auto-centering mechanism without a need for a mechanical spring.

In some embodiments, the gel-based pointing device 100 can include a support tether 114 (e.g., a string, wire, etc.) to avoid laterally overextending the gel-based body 102. The support tether 114 (or other mechanism) may limit an amount of the controlled displacement of the gel-based body in at least a lateral direction.

Illustrative Gel-Based Pointing Device in Combination with Resistive Sensors

Figure 2A:
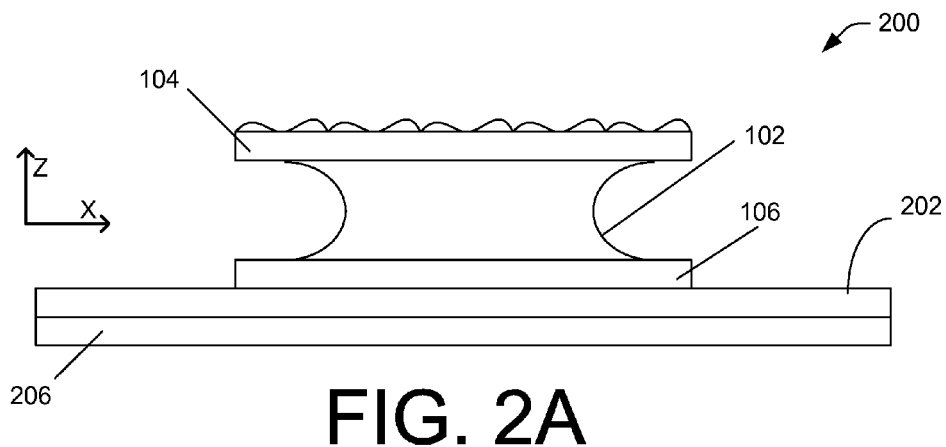
FIG. 2A is a side elevation view of an illustrative gel-based pointing device in combination with a resistive sensor.
Figure 2B:
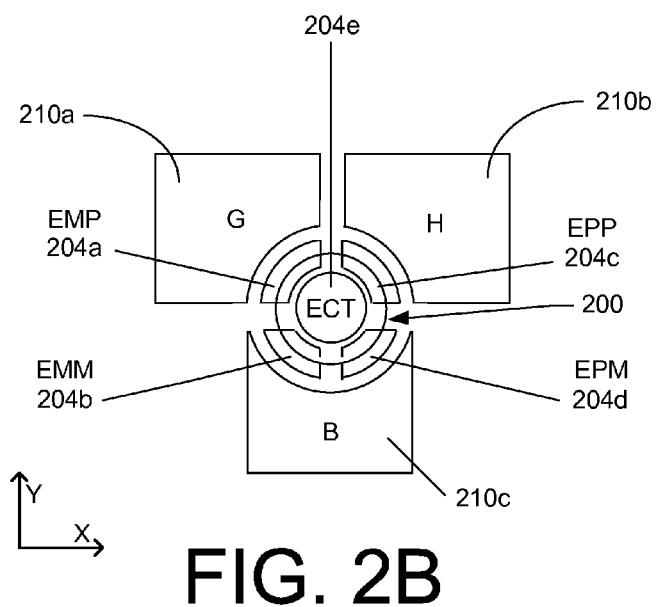
FIG. 2B is a top view of the illustrative gel-based pointing device shown in FIG. 2A.

FIG. 2A shows a gel-based pointing device 200 in combination with resistive sensors. In addition to the features of the gel-based pointing device 100 described above, gel-based pointing device 200 can include a force sensing resistive layer 202 to which the base surface 106 is coupled. The force sensing resistive layer 202 can change its resistance value or output according to pressure applied by the gel-based pointing device 200 in response to a user input. In some embodiments, the force sensing resistive layer 202 may include a resistive touch sensor. In various embodiments, as shown in FIG. 2B, the force sensing resistive layer 202 may include one or more electrodes 204. Returning to FIG. 2A, in at least one embodiment, the force sensing resistive layer 202 may be connected to a detector 206 for detecting or measuring resistance via the force sensing resistive layer 202, possibly via multiple electrodes. The detector 206 may determine the amount of force (or pressure) a user applies to the gel-based pointing device 100 and can output a gravity center force associated with a lateral displacement value and vertical pressure value to a processor. The gravity center force may be a resulting vector force having a magnitude and a direction expressed using Cartesian coordinates, polar coordinates, or other coordinate systems.

Responsive to a user applying pressure to the gel-based pointing device 200, the force sensing resistive material 202 changes its resistance value according to the applied pressure. The force sensing resistive material is connected to the detector 206. The detector 206 can measure the resistance between the one or more electrodes 204, e.g., ECT-EMP(=zEMP), ECT-EPP(=zEPP), ECT-EMM(=zEMM), ECT-EPM(=zEPM). A high pressure measurement can be indicative of low resistance. Once the detector determines the pressure being applied to the gel-based pointing device, the detector 206 can report a gravity center force associated with a lateral displacement value (x,y) and a vertical pressure value (z). Nonlimiting examples of converting equations (Equations 1-3) for the electrode placement include:

$$x = fx(1/zEPP + 1/zEPM - 1/zEMP - 1/zEMM) \qquad \text{EQU. 1}$$

$$y = fy(1/zEPP - 1/zEPM + 1/zEMP - 1/zEMM) \qquad \text{EQU. 2}$$

$$z = fz(1/zEPP + 1/zEPM + 1/zEMP + 1/zEMM) \qquad \text{EQU. 3}$$

wherein fx, fy, fz are predetermined functions.

Similar to the discussion of FIG. 1C, a finger 110 of a user can interface with the tactile surface 104 of a gel-based pointing device 200. When a user is not applying vertical or lateral pressure to the gel-based pointing device 200, the gel-based pointing device 200 is not vertically displaced or laterally displaced and the detector 206 does not detect a change in resistance. In other words, the gel-based body 102 maintains its original shape. The detector reports a default position (0,0) for the lateral displacement value (x,y) and (0) for vertical pressure value (z).

In some embodiments, a user applies lateral and/or vertical pressure to the gel-based pointing device 200. As a result, the gel-based body 102 deforms vertically and/or laterally in the direction of the user's input pressure and there is a change in the resistance of the one or more electrodes 204. The detector 206 consequently determines the amount of pressure being applied by the user action and can report a gravity center of the pressure as a lateral displacement value (xd,yd) and a vertical pressure value (z). The processor calculates the displacement and adds the displacement to a current cursor position (x,y) with some adjustment such as x+=gx(xd), y+=gy(yd). Furthermore, the processor periodically scans the new displacement, and adds to the current cursor position. In addition, vertical pressure value (z) can be used to accelerate the cursor movement, such as x+=gx(xd)*gz(z), y+=gy(yd)*gz(z), wherein gx, gy, gz are predetermined functions. In at least one embodiment, pulsed pressure changes applied to the gel-based pointing device 200 can effectuate a "click" action.

In at least the embodiments described above, the gel-based pointing device also can be used as a three dimensional pressure sensor wherein the gx(xd), gy(yd), gz(z) values are directly reported to the processor.

Once the user removes his or her finger from the tactile surface 104 of the gel-based pointing device 200, the detector 206 no longer detects an application of pressure. The gel-based pointing device 200 returns to its original shape and the default lateral displacement and vertical pressure values are reported.

FIG. 2B shows a gel-based pointing device 200 in combination with one or more sensor electrodes 204. The gel-based pointing device 200 is shown as transparent and located in the carved out space in the center of keyboard keys G (210a), H (210b), and B (210c). The one or more sensor electrodes 204 represent a sensor pad for detection of pressure applied to the gel-based pointing device 200. In at least some embodiments, the one or more electrodes 204 can include the electrodes 204a-d to measure force indicating lateral translation of the gel-based pointing device 200. Additionally, in at least some embodiments, the one or more electrodes 204 can include a center electrode 204e in the center of the circular electrodes 204a-d. The center electrode 204e may be used to detect a downward force in a z-direction (into the page as shown in FIG. 2B). However, the electrodes 204a-d, in combination, may also be used to detect a downward force in the z-direction.

In some embodiments, a fringe of curved out space or other surrounding structure of the gel-based pointing device 200 may avoid laterally overextending the gel-based pointing device 200.

In an embodiment lacking a center electrode 204e, the detector 206 measures resistance between the four circular electrodes 204a-d. When the one or more electrodes 204 lack a center electrode 204e, the resistance between the electrodes can be measured by alternative equations, e.g., EPP−EPM(=zXP), EMP−EMM(=zXM), EPP−EMP(=zYP), EPM−EMM(=zYM). In such an embodiment, nonlimiting examples of converting equations (Equations 4-6) for the one or more electrodes without a center electrode 204e include:

$$x = fx(1/zXP - 1/zXM) \quad \text{EQU. 4}$$

$$y = fy(1/zYP - 1/zYM) \quad \text{EQU. 5}$$

$$z = z(1/zXP + 1/zXM + 1/zYP + 1/zYM), \quad \text{EQU. 6}$$

wherein fx, fy, fz are predetermined functions.

In at least one embodiment, the force sensing resistive layer 202 may be a conventional touchpad and the gel-based pointing device 200 may be adhered to the conventional touchpad. For example, the conventional touchpad may be a touchpad installed on a legacy device (e.g., existing notebook computer, etc.). The gel-based pointing device 200 may be coupled to the conventional touchpad of the legacy device. The conventional touchpad may detect pressure from user manipulation of the gel-based pointing device that is coupled to the conventional touchpad. In some embodiments, software executable on the legacy device (e.g., trackpad driver software, etc.) may be configured to detect input from the gel-based pointing device and translate the input into movement of a cursor, a click action, and/or other desired actions. In some embodiments, the gel-based pointing device 200 may include a signature to allow the software to recognize or detect the gel-based pointing device without requiring adjustment of settings. In various embodiments, other portions of the conventional trackpad, such as the portion that is not underneath or directly touching the gel-based pointing device 200, may be used in a conventional manner even while the gel-based pointing device 200 is coupled to the conventional trackpad.

Similar to the discussion of FIG. 1C, a finger of a user can interface with the tactile surface 104 of a gel-based pointing device 200. When a user is not interfacing with the tactile surface 104, the detector 206 may not report a change in position. In at least one embodiment, the weight of the gel-based pointing device 200 is insufficient for the touchpad to detect a presence.

In one or more embodiments, a user places his or her finger on the gel-based pointing device 200. The touchpad detects a presence when a predetermined change of resistance is detected and the detector reports an initial, or first, finger position (x0, y0).

In some embodiments, the user applies lateral and/or vertical pressure to the gel-based pointing device 200. As a result, the gel-based body 102 deforms and there is a change in the resistance of the one or more electrodes 204. Responsive to the applied vertical pressure, the gel-based pointing device 200 displaces vertically in the direction of the user's input pressure, as determined based on the touching area size. Responsive to the applied lateral pressure, the gel-based body 102 displaces laterally in the direction of the user's input pressure. The detector 206 consequently determines the amount of pressure being applied by the user action and can report a gravity center of the pressure as a second position including a lateral displacement value (x1, y1) and a vertical pressure value (z). Based on the determined second position, the processor calculates the displacement and adds to a current cursor position (x,y) with some adjustment such as, x+=gx(x1−x0), y+=gy(y1−y0). Accordingly, the cursor position is readjusted. The system periodically scans the new fingertip position, and updates the current cursor position.

In at least one embodiment, a user applies vertical pressure of a large area of contact. The vertical pressure value (z) or area of contact (w) can be used for accelerating cursor movement, modeled by equations (Equations 7-10) such as:

$$x += gx(x1-x0)*gz(z) \quad \text{EQU. 7}$$

$$y += gy(y1-y0)*gz(z) \text{ or} \quad \text{EQU. 8}$$

$$x += gx(x1-x0)*gw(w) \quad \text{EQU. 9}$$

$$y += gy(y1-y0)*gw(w), \quad \text{EQU. 10}$$

wherein gx, gy, gz, and gw are predetermined functions. As described above, when the detector 206 detects pulsed change of vertical pressure (z) and/or the size of the area of contact (w), the detector may interpret such user action as a "click" function.

Once the user removes his or her finger from the tactile surface 104 of the gel-based pointing device 200, the detector 206 no longer detects an application of pressure and the gel-based pointing device 200 returns to its original shape. Because the user is not interfacing with the tactile surface 104, the detector 206 does not report a position.

In at least the embodiments described above, the gel-based pointing device 200 also can be used as a three dimensional pressure sensor wherein the gx(x1−x0), gy(y1−y0), gz(z) and/or gw(w) values are directly reported to the processor.

Illustrative Gel-Based Pointing Device in Combination with Capacitive Sensor

Figure 3A:
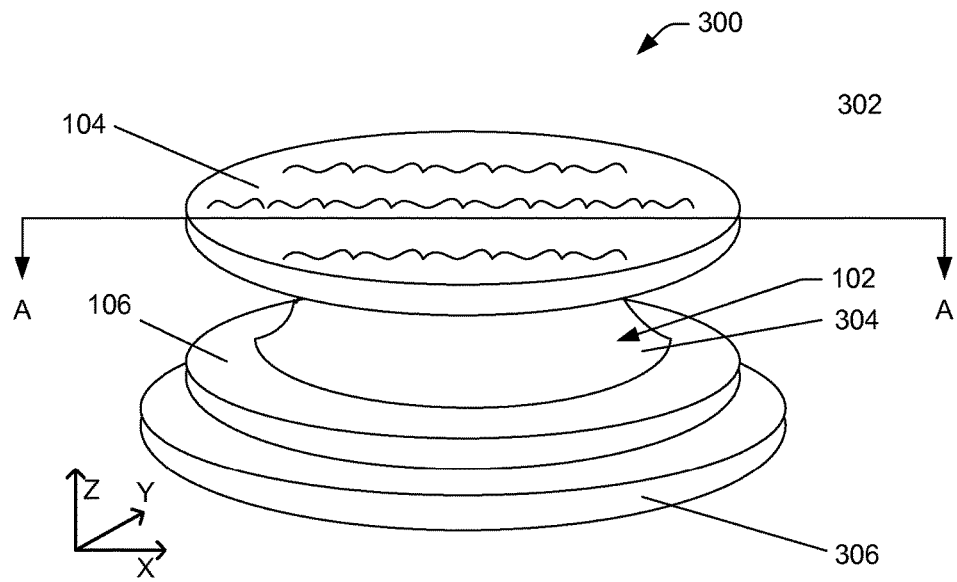
FIG. 3A is an isometric view of an illustrative gel-based pointing device in combination with a capacitive sensor.
Figure 3B:
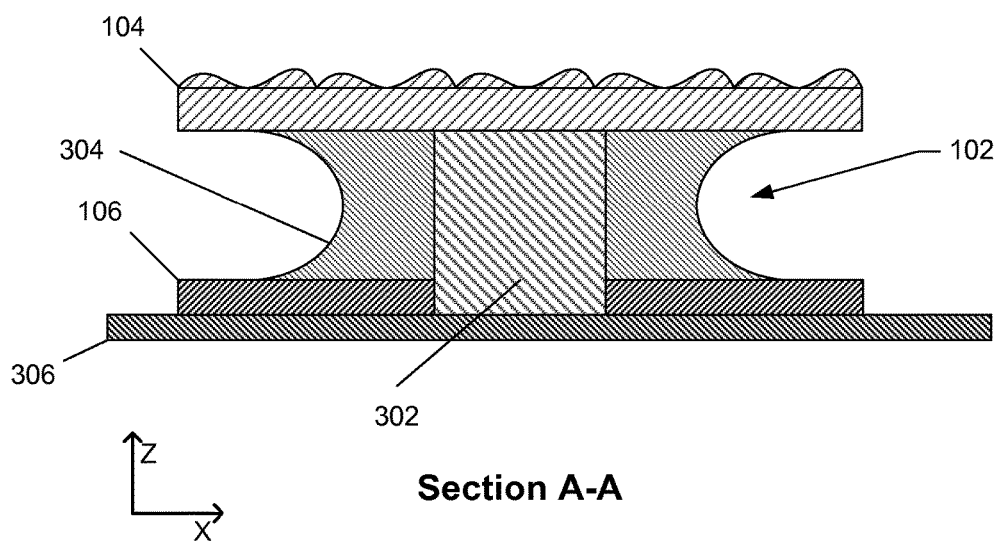
FIG. 3B is a cross-section side elevation view of the illustrative gel-based pointing device shown in FIG. 3A.

FIGS. 3A and 3B show a gel-based pointing device in combination with a capacitive sensor. In addition to the features of the gel-based pointing device 100 described above, gel-based pointing device 300 can include additional components. In at least one embodiment, some or all of the components of gel-based pointing device 300 may be formed from electrically conductive materials. In at least one embodiment, gel-based body 102 can include an interior conductive material 302 that is electrically conductive such that an electrical field of a user that touches the conductive material can pass through the conductive material and be sensed by a capacitive sensor 306 when the conductive material is between the user and the capacitive sensor 306. The interior conductive material 302 can be made out of materials including, but not limited to, a conductive gel, a soft conductive rubber, a combination of the materials discussed above, or other materials. In other embodiments, gel-based body can include an exterior gel material 304 that may not be conductive. In at least some embodiments, the interior conductive material 302 and exterior material 304 can have different conductive properties.

Additionally, the tactile surface 104 can include a thin film for stabilizing deformation. For example, the tactile surface 104 can include a thin metal sheet. The thin metal sheet can provide increased mechanical and electrical stability. The tactile surface 104 can also include an upper conductive film for receiving an electrical charge from the user through the fingertip of the user. The base surface 106 can include a thin film for stabilizing deformation. In at least some embodiments, the base surface that includes the lower film and adhesive can have an inner hole so the conductive gel 302 can be in direct contact with the sensor 306.

In at least one embodiment, the gel-based pointing device 300 can be placed onto the center position of one or more electrodes (e.g., 204a-e). In at least one embodiment, a center electrode 204e connects to the upper conductive film via the interior conductive material 302. The gel-based pointing device 300 can be associated with a detector 206 for measuring capacitance and determining the amount of pressure applied by a user. As a nonlimiting example, the detector 206 measures four capacities by measuring ECT−EMP(=cEMP), ECT−EPP(=cEPP), ECT−EMM(=cEMM), and ECT−EPM(=cEPM). A high capacitance reading can be indicative of high pressure caused by user input. Based on the determined applied pressure, the detector reports a gravity center of the pressure as a lateral displacement value (x,y) and a vertical pressure value (z). The detector can use converting equations (Equations 11-13) including, but not limited to:

$$x = fx(cEPP + cEPM − cEMP − cEMM) \quad \text{EQU. 11}$$

$$y = fy(cEPP − cEPM + cEMP − cEMM) \quad \text{EQU. 12}$$

$$z = fz(cEPP + cEPM + cEMP + cEMM) \quad \text{EQU. 13}$$

wherein fx, fy, fz are predetermined functions.

Similar to the discussion of FIG. 1C above, a finger of a user can interface with the tactile surface 104 of a gel-based pointing device 300. When a user is not applying vertical or lateral pressure to the gel-based pointing device 300, the gel-based pointing device 300 is not vertically displaced or laterally displaced and the detector 206 does not detect a change in capacitance. In other words, the gel-based body 102 maintains its original shape and the detector reports a default position (0,0) for the lateral displacement value (x,y) and (0) for vertical pressure value (z).

In some embodiments, a user applies lateral and/or vertical pressure to the gel-based pointing device 300. As a result, the gel-based body 102 deforms vertically and/or laterally in the direction of the user's input pressure and there is a change in the capacitance of the one or more electrodes 204. As a result of the one or more measured changes in capacitance, the detector 206 consequently determines the amount of pressure being applied by the user action via a processor and can report a gravity center of the pressure as a lateral displacement value (xd, yd) and a vertical pressure value (z). Furthermore, the processor periodically scans the new displacement, and adds to the current cursor position. In addition, vertical pressure value (z) can be used to accelerate the cursor movement, such as x+=gx(xd)*gz(z), y+=gy(yd)*gz(z), wherein gx, gy, gz are predetermined functions. In at least one embodiment, pulsed pressure changes applied to the gel-based pointing device 200 can effectuate a "click" action.

Once the user removes his or her finger from the tactile surface 104 of the gel-based pointing device 300, the gel-based pointing device 200 returns to its original shape and the detector 206 stops detecting a change in capacitance from an application of pressure. The default lateral displacement and vertical pressure values are reported. Accordingly, the default position is recorded.

In at least the embodiments described above, the gel-based pointing device also can be used as a three dimensional pressure sensor wherein the gx(xd), gy(yd), gz(z) values are directly reported to the processor.

In at least one embodiment, the capacitive sensor 108 may be a touchpad and the gel-based pointing device 300 may be adhered to the capacitive sensor touchpad, similar to the discussion above regarding the conventional touchpad and legacy computing device referenced with respect to FIGS. 2A and 2B. In such embodiments, software executable on a computing device can be used to detect user input via the gel-based pointing device.

Similar to the discussion of FIG. 1C above, a finger of a user can interface with a top surface of a gel-based pointing device 300. When a user is not interfacing with the top surface, the detector 206 may not report a position. In at least one embodiment, the capacitance and weight of the gel-based pointing device 300 are insufficient for the touchpad 306 to detect a presence when the user is not touching the gel-based pointing device.

In one or more embodiments, a user places his or her finger on the gel-based pointing device 300. The touchpad detects a presence when a predetermined change of capacitance is detected and the detector reports an initial, or first, finger position (x0, y0). As shown in FIG. 3A, the tactile surface 104 may be a conductive material that interfaces with the interior conductive material 302, which may be below the tactile surface 104, or the tactile surface 104 may surround the interior conductive material 302.

When combining with a capacitive sensor touchpad, similar structures as shown in FIG. 1A can also be used. In such embodiments, all components of the gel-based pointing device 100 can have conductivity for ensuring electrical connection between the capacitive sensor touchpad 108 and the finger 110.

In other embodiments, a user applies lateral and/or vertical pressure to the gel-based pointing device 300. As a result, the gel-based body 102 deforms and there can be a change in the capacitance of the one or more electrodes 204. Responsive to the applied vertical pressure, the gel-based pointing device 300 displaces vertically in the direction of the user's input pressure, as determined based on area of contact. Responsive to the applied lateral pressure, the gel-based body 102 displaces laterally in the direction of the user's input pressure. The detector 206 consequently determines a change in capacitance associated with the amount of pressure being applied by the user action and can report a gravity center of the pressure as a second position including a lateral displacement value (x1, y1) and a vertical pressure value (z). Based on the determined second position, the processor calculates the displacement and adds to a current cursor position (x,y) with some adjustment such as, x+=gx(x1−x0), y+=gy(y1−y0). Accordingly, the cursor position is readjusted. The system periodically scans the new fingertip position, and updates the current cursor position.

In at least one embodiment, a user applies vertical pressure of a large area of contact. The vertical pressure value (z) or area of contact (w) can be used for accelerating cursor movement, modeled by example equations (Equations 14-17) such as:

$$x+=gx(x1-0)*gz(z) \quad \text{EQU. 14}$$

$$y+=gy(y1-0)*gz(z) \text{ or} \quad \text{EQU. 15}$$

$$x+=gx(x1-0)*gw(w) \quad \text{EQU. 16}$$

$$y+=gy(y1-y0)*gw(w)) \quad \text{EQU. 17}$$

wherein gx, gy, gz, and gw are predetermined functions. As described above, when the detector 206 detects pulsed change of vertical pressure (z) and/or the size of the area of contact (w), the detector may interpret such user action as a "click" function.

Once the user removes his or her finger from the surface of the gel-based pointing device 300, the gel-based pointing device 300 returns to its original shape and the detector 206 stops detecting a change in capacitance from an application of pressure caused by the user. Because the user is not interfacing with the surface, the detector 206 does not report a change in position.

In at least both of the embodiments described above, the gel-based pointing device 300 also can be used as a three dimensional pressure sensor wherein the gx(x1−x0), gy(y1−y0), gz(z) and/or gw(w) values are directly reported to the processor.

Illustrative Gel-Based Pointing Device in Combination with Optical Sensor

Figure 4A:
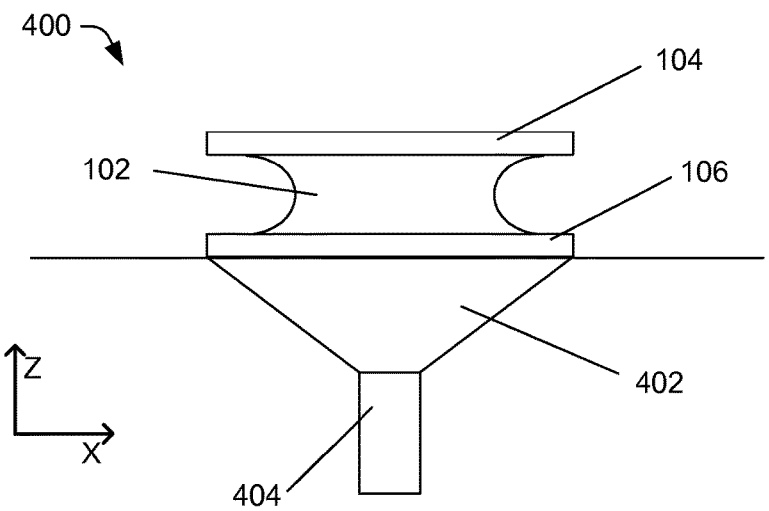
FIG. 4A is a side elevation view of an illustrative gel-based pointing device in combination with an optical sensor.

FIG. 4A shows a gel-based pointing device 400 in combination with an optical sensor. In addition to the features of the gel-based pointing device 100 described above, a gel-based pointing device 400 can include additional components. For example, in at least one embodiment, the gel-based pointing device 400 can include a transparent upper film that acts as the top surface. In some embodiments, the gel-based pointing device 400 can include an optically patterned film located under the upper film and on top of the gel-based body 102.

The gel-based pointing device 400 may include an optical sensor component including an optical lens 402 associated with the pointing device on the base surface of the gel-based pointing device 400. The optical lens 402 can facilitate recognition of user input on the tactile surface 104 of the gel-based pointing device 400. The tactile surface 104 may include a smooth portion, such as a middle portion, that does not disrupt a direction of light passing through this portion of the tactile surface 104.

The optical sensor component can also include an image sensor 404. In at least one embodiment, the image sensor 404 can be proximate to the optical lens 402 on a side opposite the side of the optical lens 402 proximate to the base surface 106. The image sensor 404 can detect a user's tactile interaction with the tactile surface 104 by detecting relative displacement of the tactile surface 104. The image sensor 404 can be in communication with a processor for tracking and/or measuring displacement of the gel-based body 102 as a result of user input action detected by the image sensor.

When the gel-based pointing device 400 is in combination with the optical lens 402 and the image sensor 404, some or all of the components can be at least partially transparent such that the image sensor 404 can capture imagery of a user's finger (e.g., fingerprint, etc.) and/or an optically patterned film in the tactile surface 104 of the gel-based pointing device 400 through the gel-based body 102 and one or more base layers of the gel-based pointing device 400 when the gel is between the optical lens 402 and the user's finger. In at least one embodiment, the image sensor 404 may be configured to recognize and identify a user's fingerprint through the tactile surface 104, gel-based body 102, and one or more base layers 106 of the gel-based pointing device 400. As a result, the functionality of the gel-based pointing device 400 and/or other devices, operations, etc. can be restricted to users of the gel-based pointing device 400 that have fingerprint associated with an authorized user. Thus, the image sensor 404 can be used for authentication.

Figure 4B:
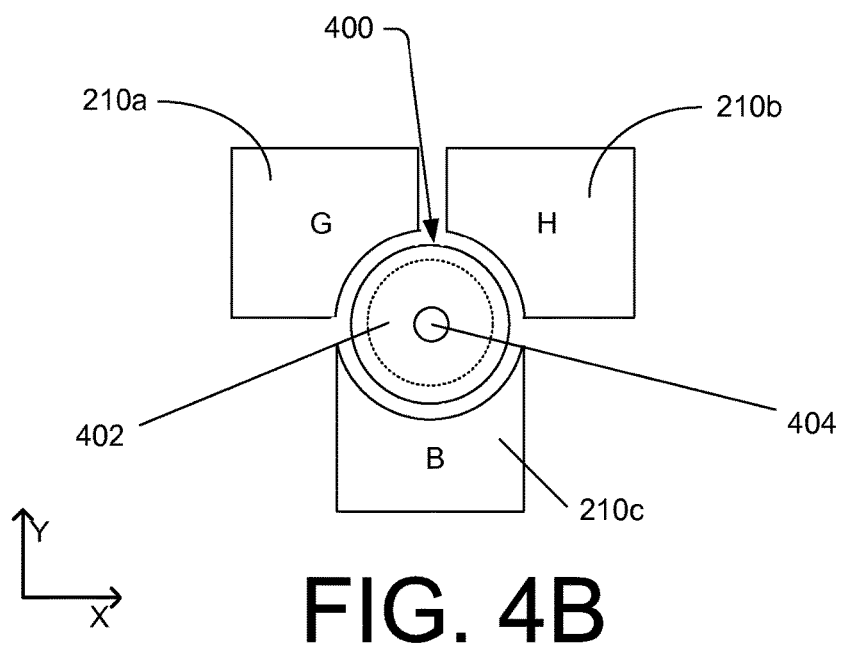
FIG. 4B is a top view of the illustrative gel-based pointing device shown in FIG. 4A.

FIG. 4A shows top-view of a gel-based pointing device 400 in combination with an optical sensor. FIG. 4B depicts the gel-based pointing device 400 including the optical lens 402 and the image sensor 404 shown in the carved out space in the center of keyboard keys G (210a), H (210b), and B (210c).

In some embodiments, the fringe of curved out space or other surrounding structure of the gel-based pointing device 400 may avoid laterally overextending the gel-based pointing device 400.

FIGS. 4C-E show user interaction with a gel-based pointing device in combination with an optical sensor. In at least some embodiments, the image sensor 404 can be associated with or located within a touch sensitive surface such that the touch sensitive surface can capture imagery of a user's finger when the gel is between the optical lens 402 and the user's finger. Similar to the discussion of FIG. 1C, a finger 110 of a user can interface with the tactile surface 104 of a gel-based pointing device 400. However, when a user is not interfacing with the tactile surface 104, the image sensor 404 may not capture an image as illustrated by the blank circle 406 (representing example imagery captured by the image sensor 404), and the image sensor 404 may not report a position.

In some embodiments, a user places his or her finger on the tactile surface 104 of the gel-based pointing device 400. As a result, the image sensor 404 captures an initial image as illustrated by circle 408 (representing example imagery captured by the image sensor 404) and the image sensor 404 determines an initial position. The detector reports a default, or first, position (M0) (0,0) for the lateral displacement value (x,y) and (0) for vertical pressure value (z).

In other embodiments, a user applies lateral pressure to the gel-based pointing device 400 as illustrated by the left facing arrow 412. As a result, the image slides as illustrated by circle 410 (representing example imagery captured by the image sensor 404) and the image sensor 404 determines a second position (Md). Then, the image sensor 404 compares the first position (M0) with the second position (Md) and calculates the optical flow between the first position (M0) and the second position (Md). The image sensor 404 reports and/or outputs one or more signals indicating a direction and magnitude of the displacement (xd,yd) as determined by comparing the first position (M0) and the second position (Md). In some embodiments, the processor is configured to compare the first position (M0) with the second position (Md) and output the one or more signals as determined by comparing the first position (M0) and the second position (Md). The processor can calculate the displacement and add the displacement to a current cursor position (x,y) with some adjustment such as x+=gx(xd), y+=gy(yd), wherein gx and gy are predetermined functions. Furthermore, the processor periodically scans the new displacement, and adds to the current cursor position.

Once the user removes his or her finger 110 from the tactile surface 104 of the gel-based pointing device 400, the image sensor 404 no longer captures an image and the image sensor 404 causes a termination in a change in position.

In at least one embodiment, the image sensor 404 can capture the optically patterned film, a reference point, or other location identifiers through the optical lens 402, instead of a fingerprint, to execute the process described above. In at least one embodiment, the optically patterned film 414 or other location identifiers may have partial-transparency.

FIGS. 4F and 4G are side elevation views of the illustrative gel-based pointing device of FIG. 4B before and during engagement by a finger of a user. The optically patterned film 414 is shown in the center of circle 416. Similar to the discussion of FIG. 1C, a finger 110 of a user can interface with the tactile surface 104 of a gel-based pointing device 400. When a user is not interfacing with the tactile surface 104, the image sensor 404 can capture a default image of the optically patterned film 414 as illustrated by the circle 416 (representing example imagery captured by the image sensor 404), and the image sensor 404 may not report a position. Alternatively, the image sensor 404 may report a default or first position, (M0) (0,0) for the lateral displacement value (x,y) and (0) for vertical pressure value (z).

In some embodiments, a user places his or her finger on the tactile surface 104 of the gel-based pointing device 400. A user can apply lateral pressure to the gel-based pointing device 400 as illustrated by the left facing arrow 412. As a result, the image of the optically patterned film 414 slides as illustrated by circle 418 (representing example imagery captured by the image sensor 404) and the image sensor 404 determines a second position (Md). Then, the image sensor 404 calculates the optical flow between the first position (M0) and the second position (Md) and reports a direction and magnitude of the displacement (xd,yd). In some embodiments, the processor can calculate the displacement by comparing the first position (M0) and the second position (Md) and can output one or more signals indicating direction and magnitude of the displacement. The processor can calculate the displacement and add the displacement to a current cursor position (x,y) with some adjustment such as x+=gx(xd), y+=gy(yd), wherein gx and gy are predetermined functions. Furthermore, the processor periodically scans the new displacement, and adds to the current cursor position.

Once the user removes his or her finger 110 from the tactile surface 104 of the gel-based pointing device 400, the image sensor 404 may discontinue capturing imagery and the image sensor 404 may causes a termination in a change in position.

In some embodiments, the detection of the fingerprint, or lack thereof, may cause a cursor to appear or disappear, respectively. Thus, a cursor controlled by the gel-based pointing device 400 may be visible when the gel-based pointing device 400 is in contact with the user via the user's finger 110. This may be employed in any type of configuration that can detect a touch of the user, including use of the capacitive sensor.

In at least one embodiment, a user interfaces with the tactile surface 104 for a short duration (e.g., less than a threshold number of milliseconds). As a result, the fingertip image can only be captured for that short duration and the detector detects such user action as a "click" function.

In some embodiments, the calculated optical flow between (Md) and (M0) can have a rotational component (r). In such embodiments, the rotational component (r) can be used for other operations such as zooming, rotating, etc.

Additional Embodiments

FIGS. 5A-C show additional embodiments of a gel-based pointing device. A gel-based pointing device 500 can have similar features of gel-based pointing device 100 described above. However, in at least one embodiment, the width or diameter of the base surface 106 of gel-based pointing device 500 can be less than the width or diameter of the gel-based body 102 creating an overhang of the gel-based body 102 over the base surface 106. The varying widths or diameters of the base surface 106 and the gel-based body 102 can enlarge the center of gravity of the gel-based pointing device 500 and increase sensitivity.

As shown in FIGS. 5B-C, similar to the discussion of FIG. 1C, a finger 110 of a user can interface with the tactile surface 104 of a gel-based pointing device 500. As shown in FIG. 5A, when a user is not applying vertical or lateral pressure to the gel-based pointing device 500, the gel-based pointing device 500 is not vertically displaced or laterally displaced. In other words, the gel-based body 102 maintains its original shape. The detector reports a default position (0,0) for the lateral displacement value (x,y) and (0) for vertical pressure value (z).

In some embodiments, a user applies lateral and/or vertical pressure to the gel-based pointing device 500. FIG. 5B shows user interaction with the gel-based pointing device 500 wherein the user is applying lateral pressure in the direction of left-facing arrow 502. When a user applies lateral movement, a rear section of the gel-based body 102 perimeter moves away from the sensor 504 (see arrow 506). Simultaneously, a front section of the gel-based body 102 perimeter opposite the rear section moves toward the touch sensitive surface (see arrow 508). Depending on the amount of pressure applied by the user, the front section of the gel-based body 102 perimeter can touch the sensor at an intersection 510.

FIG. 5C shows user interaction with the gel-based pointing device 500 wherein the user is applying vertical pressure in the direction of arrow 512. When a user applies vertical pressure, the perimeter of the gel-based body 102 moves toward the sensor 504 such that the gel-based body 102 perimeter touches the sensor surface in a plurality of locations at intersections 514 and 516.

Once the user removes his or her finger 110 from the tactile surface 104 of the gel-based pointing device 500, the detector 206 no longer detects an application of pressure and the gel-based body 102 returns to its original shape.

In at least one embodiment, the sensor 504 may be a touchpad and the gel-based pointing device 200 may be coupled (e.g., adhered, etc.) to the sensor touchpad. In such an embodiment, software executable on a computing device can be used to detect user input.

Figure 6A:
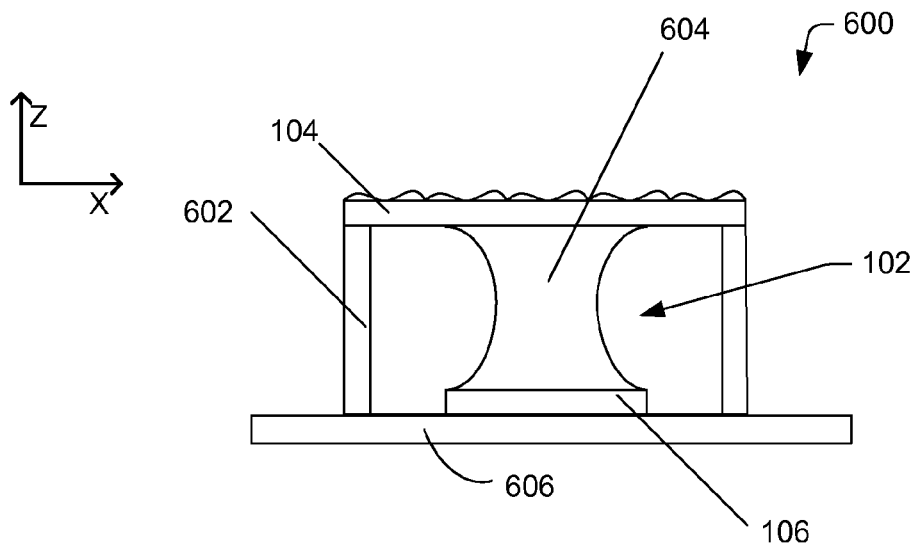
FIG. 6A is a side elevation view of yet another illustrative gel-based pointing device.

FIG. 6A shows another embodiment of a gel-based pointing device. Gel-based pointing device 600 can have similar features of the gel-based pointing device 100 described above. However, in at least some embodiments, the gel-based body of gel-based pointing device 600 can include a housing. In FIG. 6, the housing is shown as a cylinder 602. However, the housing can have different shapes and sizes, depending on the shape of the gel-based pointing device 600. In at least some embodiments, the housing cylinder 602 can be made of a material that is harder than the interior gel material 604. If the sensor 606 is a capacitive sensor or a capacitive touchpad, the housing cylinder 602 can be conductive, for example, the housing cylinder 602 can be made out of conductive rubber or other conductive materials having similar hardness. The housing cylinder 602 includes an interior gel material 604 that fills a center of the hollow part of the housing cylinder 602. If the sensor 606 is a capacitive sensor that has a center electrode such as 204e shown in FIG. 2B, the interior gel material 604 can be conductive and its footprint is equal to the center electrode 204e. In other embodiments, if the sensor 606 is a capacitive touchpad, the interior gel material 604 can be conductive. However, in other embodiments, for example in a resistive sensor, both the housing cylinder 602 and the interior gel material 604 can be conductive or nonconductive. In at least one embodiment, the housing cylinder 602 comes into direct contact with the sensor 606. The housing cylinder 602 interfaces with the sensor 606 possibly by sliding across a top surface of the sensor 606. The housing cylinder 602 is anchored to the sensor 606, or an intervening surface, by the interior gel material 604.

Figure 6B:
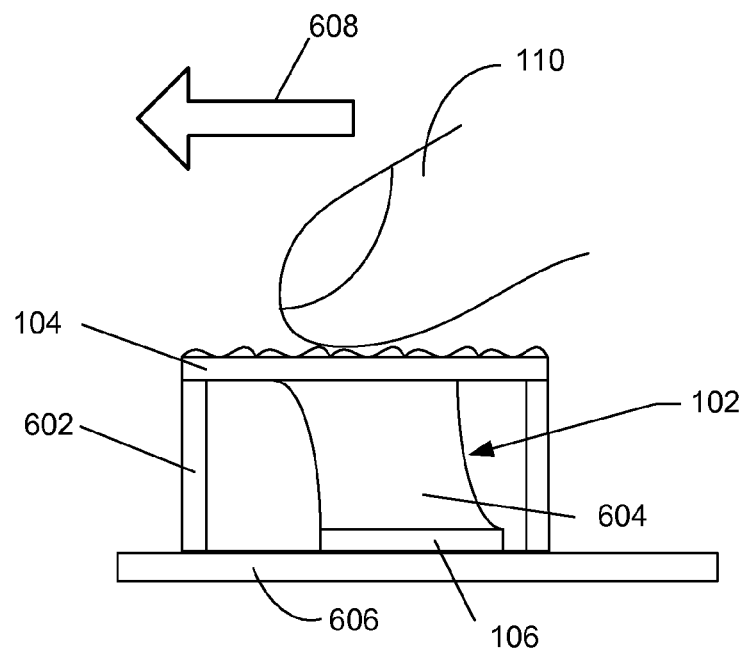
FIG. 6B is a side elevation view of the illustrative gel-based pointing device shown in FIG. 6A while engaged by a finger of a user.

FIG. 6B shows user interaction with gel-based pointing device 600. Similar to the discussion of FIG. 1C, a finger 110 of a user can interface with the tactile surface 104 of a gel-based pointing device 600, which may be part of the housing cylinder 602. When a user is not applying vertical or lateral pressure to the gel-based pointing device 600, the gel-based pointing device 600 is not vertically displaced or laterally displaced and the sensor 606 does not detect a change in capacitance or resistance. In other words, the gel-based body 102 maintains its original shape. The detector reports a default, or first, position (0,0) for the lateral displacement value (x,y) and (0) for vertical pressure value (z).

When a user interfaces with the tactile surface 104 of the gel-based pointing device 600, there can be a change in the capacitance or resistance sensed by the sensor 606. The sensor 606 consequently determines the center position (x0,y0) of the gel-based body 102.

In some embodiments, a user applies lateral pressure to the gel-based pointing device 600 as shown by the left-pointing arrow 608 in FIG. 6B. As a result, the housing cylinder 602 slides on the surface of the sensor 606 causing a change in capacitance or resistance of the sensor. The sensor 606 consequently determines the amount of pressure being applied by the user action via a processor and can report a gravity center of the pressure as a second position including a lateral displacement value, identifying a new center position (x1, y1) of the gel-based pointing device 600.

In some embodiments, the housing cylinder 602 can avoid laterally overextending the gel-based pointing device 600.

Once the user removes his or her finger 110 from the tactile surface 104 of the gel-based pointing device 600, the sensor 606 may no longer detect an application of pressure. The gel-based pointing body 102 returns to its original shape and the detector reports the default position.

In at least one embodiment, the sensor 606 can be a touchpad and the gel-based pointing device 600 may be coupled (e.g., adhered, etc.) to the sensor touchpad. In such an embodiment, software executable on a computing device can be used to detect user input as discussed above.

The electrode placements and equations are not limited to those described above. The examples described above can be combined with a variety of keyboard mechanisms, for example, force sensing resistive, membrane, capacitive, and/or mechanical materials, or some combination of the above. In at least some embodiments, to reduce the cost of manufacturing, when one of the above listed materials is used for keyboard function, the same structure of electrodes and detector can be used for the gel-based pointing device.

Figure 7C:
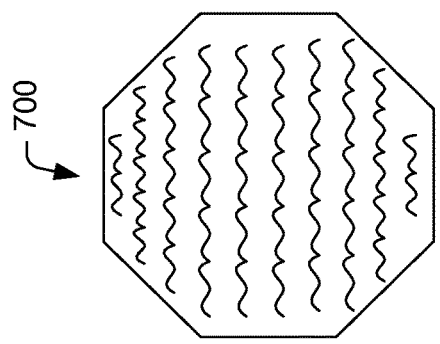
FIG. 7C is a top view of a generally octagonal-shaped illustrative gel-based pointing device.
Figure 7B:
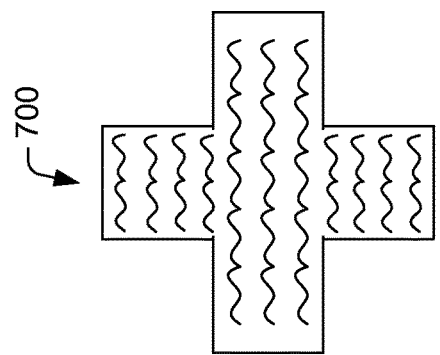
FIG. 7B is a top view of a cross-shaped illustrative gel-based pointing device.
Figure 7A:
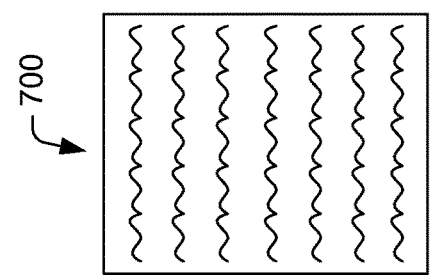
FIG. 7A is a top view of a generally rectangular-shaped illustrative gel-based pointing device.

FIGS. 7A-7C are top views of illustrative gel-based pointing devices having different shapes. As described above, the gel-based pointing device 700 can have different shapes and sizes. For example, FIG. 7A shows a top view of a gel-based pointing device 700 having a generally rectangular shape. A gel-based pointing device 700 having a generally rectangular shape can be affixed to a sensor vertically or horizontally. In some embodiments, a gel-based pointing device 700 can also have a generally square shape. FIG. 7B shows a top view of a gel-based pointing device having an "X" or cross-shape. FIG. 7C shows a top view of the gel-based pointing device having a generally octagonal shape. In some embodiments, the gel-based pointing device 700 can have a customized shape. Further, one or more gel-based pointing devices 700 can be aligned next to one another on a sensor.

In at least some embodiments, one or more gel-based pointing devices 700 can vary in height, width, and thickness.

FIGS. 8A-D show side elevation views of the gel-based pointing device of FIG. 7A having a vertical thickness resulting in a gel-based bar-like pointing device 800 that can be affixed horizontally or vertically to a sensor. In FIG. 8A, the gel-based pointing device 800 is horizontally affixed to a sensor. A user, via the user's finger, can interface with the tactile surface 104 of the gel-based pointing device 800. In at least one embodiment, the user can apply pressure in a front to back and back to front direction to the gel-based pointing device 800. The applied pressure can cause displacement of the gel-based body 102 relative to the base surface 106, without the user's finger 110 moving relative to the tactile surface 104. The displacement, or deflection, can be detected by the detector and can translate to vertical movement (e.g., vertical sliding movement, etc.) of a cursor, etc.

FIG. 8B shows a side elevation view of the gel-based pointing device 800 that is affixed horizontally on a sensor. A user's finger 110 is interfacing with the gel-based pointing device 800 in a direction shown by arrow 802. The gel-based pointing device 800 deflects in the same direction as the applied pressure and vertical movement (e.g., vertical sliding movement, etc.) of a cursor, etc. can result. In at least other embodiments, the user may interface with the gel-based pointing device 800 that is affixed horizontally on a sensor by applying pressure in a left to right and right to left direction, wherein horizontal movement (e.g., horizontal sliding movement, etc.) of a cursor, etc. can result.

In FIG. 8C, the gel-based pointing device 800 is vertically affixed to a sensor. A user, via the user's finger, can interface with the tactile surface 104 of the gel-based pointing device 800. In at least one embodiment, the user can apply pressure in a left to right and right to left direction to the gel-based pointing device 800. The applied pressure can cause displacement of the gel-based body 102 relative to the base surface 106, without the user's finger 110 moving relative to the tactile surface 104. The displacement, or deflection, can be detected by the detector and can translate to horizontal movement (e.g., horizontal sliding movement, etc.) of a cursor, etc.

FIG. 8D shows a side elevation view of the gel-based pointing device 800 that is affixed vertically to a sensor. A user's finger 110 is interfacing with the gel-based pointing device 800 in a direction shown by arrow 804. The gel-based pointing device 800 can deflect in the same direction as the applied pressure and horizontal movement (e.g., horizontal sliding movement, etc.) of a cursor, etc. can result. In at least some embodiments, the user may interface with the gel-based pointing device 800 that is affixed vertically on a sensor by applying pressure in a front to back and back to front direction, wherein vertical movement (e.g., vertical sliding movement, etc.) of a cursor, etc. can result.

In at least some embodiments, a gel-based pointing device can have larger forms and replace at least part of a keyboard. For example, in at least one embodiment, a gel-based pointing device can overlay a button-switch, key-pad, or full keyboard. In such embodiments, three dimensional pressure can be sensed by the sensor and reported directly to a processor as described above. In at least some embodiments, one or more keytops have individual sensors. In at least other embodiments, all keytops are mounted on a single sensor or at least some keys share a single sensor. The sensor can be capacitive, resistive, or a combination of the two. Furthermore, in at least one embodiment, the sensor can be a touch surface sensor.

Illustrative Environment

Figure 9:
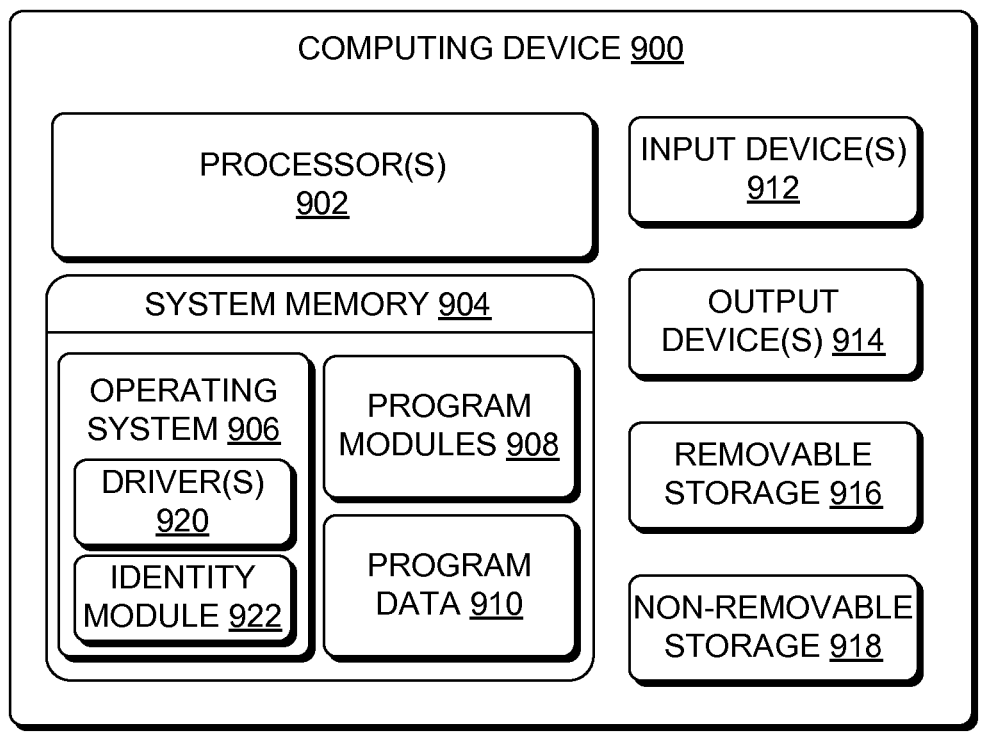
FIG. 9 is a schematic diagram of an illustrative computing device that may process user input using a gel-based pointing device.

FIG. 9 is a block diagram of the illustrative computing device 900 and the one or more components that can track displacement of a gel-based pointing device and cause updates to a graphical user interface, among other possible operations. The computing device 900 may include one or more processor(s) 902 and memory 904. The memory may be used to store instructions that, when executed by the processor(s) 902, cause the processor(s) to perform at least a portion of the processes described herein. The instructions may be stored in the memory 904 in the form of various components, modules, or other types of instructions that facilitate the processes described herein.

In accordance with some embodiments, the memory 904 may be used to receive information from a processor tracking displacement of a gel-based pointing device.

The illustrative computing device 900 includes example architecture having a hardware and logical configuration and that may incorporate or receive input using the gel-based pointing device disclosed herein. The environment described constitutes but one example and is not intended to limit application of the system described above to any one particular operating environment. Other environments may be used without departing from the spirit and scope of the claimed subject matter. The various types of processing described herein may be implemented in any number of environments including, but not limited to, stand alone computing systems, mobile computing device, notebook computers, ultrabook computers, gaming consoles, remote controls, tablet computers, televisions, book reading devices, mobile telephones, music players, video players, and/or any other electronic device requiring user input for interaction with a graphical user interface. FIG. 9 illustrates a variety of devices and components that may be implemented in a variety of environments in which tracking displacement of a gel-based pointing device and reporting an associated position may be implemented.

The memory 904 may store an operating system 906, and one or more program modules 908, and one or more program data 910 running thereon.

Device 900 may include communication connection(s) for exchanging data with other devices, such as via a network, direct connection, and so forth. The communication connection(s) can facilitate communications within a wide variety of networks 1204 according to multiple protocol types, including wired networks (e.g., LAN, cable, etc.) and wireless networks (e.g., WLAN, cellular, satellite, etc.), the Internet and the like, which are not enumerated herein. Device 900 may also include at least one display device, which may be any known display device such as an LCD or CRT monitor, television, projector, touch screen or other display or screen device. Device 900 may also include input 912/output 914 devices, which may include a mouse and a keyboard, a remote controller, a camera, microphone, a joystick, and so forth. Furthermore, device 900 may also include output devices 914, such as speakers, printers, and the like that are able to communicate through a system bus or other suitable connection, which are not enumerated herein.

The memory 904, meanwhile, may include computer-readable storage media. Computer-readable storage media includes, but is not limited to computer-readable storage media for storing instructions such as computer readable instructions, data structures, program modules, or other data, which are executed by processors to perform the various functions described above. For example, computer-readable storage media may include memory devices, such as volatile memory and non-volatile memory, and removable 916 and non-removable 918 media implemented in any method or technology for storage of information. Further, computer-readable storage media includes, but is not limited to, one or more mass storage devices, such as hard disk drives, solid-state drives, random access memory (RAM), read only memory (ROM), electrically erasable programmable read-only memory (EEPROM), removable media, including external and removable drives, memory cards, flash memory, floppy disks, optical disks (e.g., CD-ROM, digital versatile disks (DVD) or other optical storage), magnetic cassettes, magnetic tape, magnetic disk storage or other magnetic storage devices, storage arrays, storage area networks, network attached storage, or any other medium or combination thereof that can be used to store information for access by a computing device.

Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module" or "component" can represent program code (and/or declarative-type instructions) for performing specified tasks or operations when executed on a processing device or devices (e.g., CPUs or processors). The program code can be stored in one or more computer-readable memory devices or other computer-readable storage devices. Thus, the processes, logic and modules described herein may be implemented by a computer program product.

Although illustrated in FIG. 9 as being stored in memory 904, modules 908, or portions thereof, may be implemented using any form of computer-readable media that is accessible by device 900. Computer-readable media may include, for example, computer-readable storage media as described above and communications media. Computer-readable storage media is configured to store data on a tangible medium, while communications media is not.

In contrast to the computer-readable storage media mentioned above, communication media may embody computer readable instructions, data structures, program modules, or other data in a modulated data signal, such as a carrier wave, or other transport mechanism.

Operating system 906 may further include other operating system components, such a user interface component, a kernel, and so forth. Further, memory 904 may include other modules, such as device drivers, and the like, as well as other data, such as data used by other applications 910.

In some embodiments, the operating system 906, or possibly other software, may include drivers 920 and/or an identity module 922. The drivers 920 may include drivers that detect a presence of the gel-based pointing device and/or process signals received in response to use of the gel-based pointing device. For example, the drivers 920 may allow a user to couple (e.g., adhere, etc.) a gel-based pointing device to a trackpad of a legacy device that does not come pre-equipped with the gel-based pointing device. The drivers 920 may recognize the gel-based pointing device based on one or more of a user input (e.g., control settings, etc.), detection of a unique signature of the gel-based pointing device, downloaded data, or by other techniques. The signature may be an optical signature, presence signature (e.g., capacitance signature, resistive signature, etc.), and so forth that allows the computing device, via the drivers 920, to recognize the gel-based pointing device. The drivers 920 may also process signals from the gel-based pointing device to cause interaction with the graphical user interface (e.g., movement of a cursor, clicking actions, etc.).

Meanwhile, the identity module 922 may enable a determination of an identity of a user, such as by determining or recognizing a user via a fingerprint or other identifier via the gel-based pointing device. For example, when the gel-based pointing device includes the optical sensor 404, the identity module 922 may obtain fingerprint data from a finger touching the gel-based pointing device. The identity module 922 may identify the user, such as via a whitelist, and provide control based on predetermined rules. (e.g., access controls, etc.).

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation or embodiment, and the appearances of these phrases in various places in the specification are not necessarily all referring to the same implementation.

CONCLUSION

In closing, although the various embodiments have been described in language specific to structural features and/or methodical acts, it is to be understood that the subject matter defined in the appended representations is not necessarily limited to the specific features or acts described. Rather, the specific features and acts are disclosed as example forms of implementing the claimed subject matter.

What is claimed is:

1. A pointing device comprising:
   a gel-based portion to interface with an optical lens and receive a tactile interaction, the gel-based portion including:
      a gel-based body that allows controlled displacement during the tactile interaction and retains a default shape absent the tactile interaction, wherein the gel-based body is at least partially transparent;
      a tactile surface directly affixed to a first side of the gel-based body, the tactile surface configured to receive the tactile interaction from a finger of a user that causes the controlled displacement of at least a portion of the gel-based body; and
      a base surface directly affixed to a second side of the gel-based body that is opposite the first side, wherein the base surface is at least partially transparent and adheres the gel-based body to the optical lens; and
   an optical sensor component that includes the optical lens and an image sensor, wherein the optical lens separates the base surface from the image sensor, the image sensor to detect the tactile interaction by detecting lateral displacement of the tactile surface relative to the base surface.

2. The pointing device of claim 1, wherein the optical sensor component further comprises a processor in communication with the image sensor to measure the lateral displacement detected by the image sensor.

3. The pointing device of claim 2, wherein:
   the image sensor is configured to perform acts including:
      capturing a first image at a first time and a second image at a second time after the first time; and
   the processor is configured to perform acts including:
      comparing the first image and the second image to determine a direction and a magnitude of the lateral displacement; and
      outputting one or more signals indicating the direction and the magnitude of the lateral displacement.

4. The pointing device of claim 3, wherein:
   the tactile surface is at least partially transparent and the first image and the second image comprise a fingerprint of the user; and
   the processor is further configured to perform acts including determining an identity of the user based at least in part on the fingerprint.

5. The pointing device of claim 3, wherein:
   the tactile surface is at least partially transparent and further comprises:

a transparent upper film; and
a patterned film located under the upper film; and
the first image comprises an image of the patterned film in a first location and the second image comprises an image of the patterned film in a second location.

6. The pointing device of claim 3, wherein the processor is further configured to perform acts comprising:
comparing the first image and the second image to determine a rotational displacement of the tactile surface relative to the base surface; and
outputting a signal indicating the rotational displacement of the tactile surface relative to the base surface.

7. The pointing device of claim 1, wherein the gel-based body further includes a support tether that limits an amount of the lateral displacement of the tactile surface relative to the base surface.

8. The pointing device of claim 1, further comprising a housing coupled to the gel-based body, the housing including a recess that at least partially encloses the gel-based body, the housing including the tactile surface.

9. The pointing device of claim 1, wherein:
the gel-based body comprises a first material;
the tactile surface comprises a second material; and
the first material is different from the second material.

10. The pointing device of claim 1, wherein the gel-based body comprises a solid body.

11. A pointing device comprising:
a gel-based body to provide at least controlled lateral displacement during a tactile interaction with the pointing device and to retain a default shape absent the tactile interaction, wherein the gel-based body is at least partially transparent;
a tactile surface directly affixed to a first side of the gel-based body, the tactile surface configured to receive the tactile interaction; and
a base surface directly affixed to a second side of the gel-based body that is opposite the first side, wherein the base surface is at least partially transparent and adheres the gel-based body to a surface associated with an optical sensor component.

12. The pointing device of claim 11, wherein the optical sensor component comprises:
an image sensor to capture movement of the tactile surface in response to the tactile interaction, the image sensor in optical communication with the tactile surface and located on a side opposite the base surface, the image sensor performing acts including:
capturing a first image at a first time and a second image at a second time after the first time;
comparing the first image and the second image to determine the lateral displacement; and
outputting one or more signals indicating the lateral displacement; and
a processor to process the one or more signals to track the lateral displacement, the processor in communication with the image sensor.

13. The pointing device of claim 12, wherein the one or more signals indicate at least one direction or magnitude of the lateral displacement as determined by the comparing of the first image and the second image.

14. The pointing device of claim 12, wherein the tactile surface is at least partially transparent and the first image comprises an image of a fingerprint of a user in a first location and the second image comprises an image of the fingerprint in a second location.

15. The pointing device of claim 12, wherein the processor is further configured to perform acts including determining a user identity based at least in part on a fingerprint associated with a user.

16. The pointing device of claim 12, wherein the tactile surface is at least partially transparent and further comprises:
a transparent upper film; and
a patterned film located under the upper film.

17. The pointing device of claim 16, wherein the first image comprises an image of the patterned film in a first location and the second image comprises an image of the patterned film in a second location.

18. An apparatus comprising:
a gel-based body to provide at least lateral displacement during a touch input and to retain a default shape absent the touch input, wherein the gel-based body is at least partially transparent;
a top surface directly coupled to a first side of the gel-based body, the top surface configured to receive the touch input; and
a base surface directly coupled to a second side of the gel-based body that is opposite the first side, wherein the base surface couples the gel-based body to an optical lens and is at least partially transparent.

19. The apparatus as recited in claim 18, further comprising an image sensor to capture movement of the top surface in response to the touch input, the image sensor in optical communication with the top surface and located on a side of the optical lens opposite the base surface, the image sensor performing acts including capturing a first image at a first time and a second image at a second time after the first time.

20. The apparatus as recited in claim 19, further comprising a processor in communication with the image sensor to measure lateral displacement of the gel-based body in response to the touch input detected by the image sensor, wherein measuring the lateral displacement comprises:
comparing the first image and the second image to determine at least one of a direction or a magnitude of the lateral displacement; and
outputting one or more signals indicating the at least one of the direction or the magnitude of the lateral displacement.

* * * * *